United States Patent [19]
Bergerson

[11] Patent Number: 5,679,457
[45] Date of Patent: Oct. 21, 1997

[54] THERMALLY CONDUCTIVE INTERFACE FOR ELECTRONIC DEVICES

[75] Inventor: Steven E. Bergerson, St. Louis Park, Minn.

[73] Assignee: The Bergquist Company, Minneapolis, Minn.

[21] Appl. No.: 617,024

[22] Filed: Mar. 18, 1996

Related U.S. Application Data

[63] Continuation-in-part of Ser. No. 445,048, May 19, 1995, abandoned.

[51] Int. Cl.$^6$ ........................................... B32B 7/12
[52] U.S. Cl. .................... 428/344; 428/354; 428/355; 428/447; 428/450; 428/473.5; 428/901
[58] Field of Search ........................... 428/283, 285, 428/323, 328, 242, 244, 251, 266, 446, 447, 450, 901, 267, 268, 473.5, 344, 354, 355; 439/91

[56] References Cited

U.S. PATENT DOCUMENTS

| | | |
|---|---|---|
| 2,983,853 | 5/1961 | Williams . |
| 3,258,661 | 6/1966 | Mierendorf et al. . |
| 3,284,678 | 11/1966 | McBride . |
| 3,325,582 | 6/1967 | Ehrmann et al. . |
| 3,568,042 | 3/1971 | Ernst . |
| 3,611,065 | 10/1971 | Zschauer et al. . |
| 4,486,495 | 12/1984 | Matsushita et al. ............... 428/266 |
| 4,574,879 | 3/1986 | DeGree et al. . |
| 4,981,544 | 1/1991 | Nordale ................................ 156/252 |
| 5,028,984 | 7/1991 | Ameen et al. . |
| 5,055,909 | 10/1991 | Culver . |
| 5,146,981 | 9/1992 | Samarov . |
| 5,208,126 | 5/1993 | Tachikawa et al. ............... 430/49 |
| 5,213,868 | 5/1993 | Liberty et al. ..................... 428/131 |
| 5,258,649 | 11/1993 | Tanaka et al. . |
| 5,298,791 | 3/1994 | Liberty et al. ..................... 257/707 |

FOREIGN PATENT DOCUMENTS 6155517  6/1994  Japan .

*Primary Examiner*—James J. Bell
*Attorney, Agent, or Firm*—Haugen and Nikolai, P.A.

[57] ABSTRACT

A mechanically conformable thermally conductive interface for use in electrically isolating and thermally connecting printed circuit boards to either heat sinks, metal chasses, or heat spreaders. The interface material utilizes silicone polymers of controlled molecular weight and a surface layer of a pressure sensitive adhesive may be employed. The silicone polymer is filled with a thermally conductive electrically insulative particulate such as alumina and/or boron nitride, with the silicone being prepared as a reaction product of a liquid organosiloxane together with a chain extender such as a hydride terminated polydimethylsiloxane material. A release film such as polyethylene may be utilized as the undersurface layer, if desired.

13 Claims, 6 Drawing Sheets

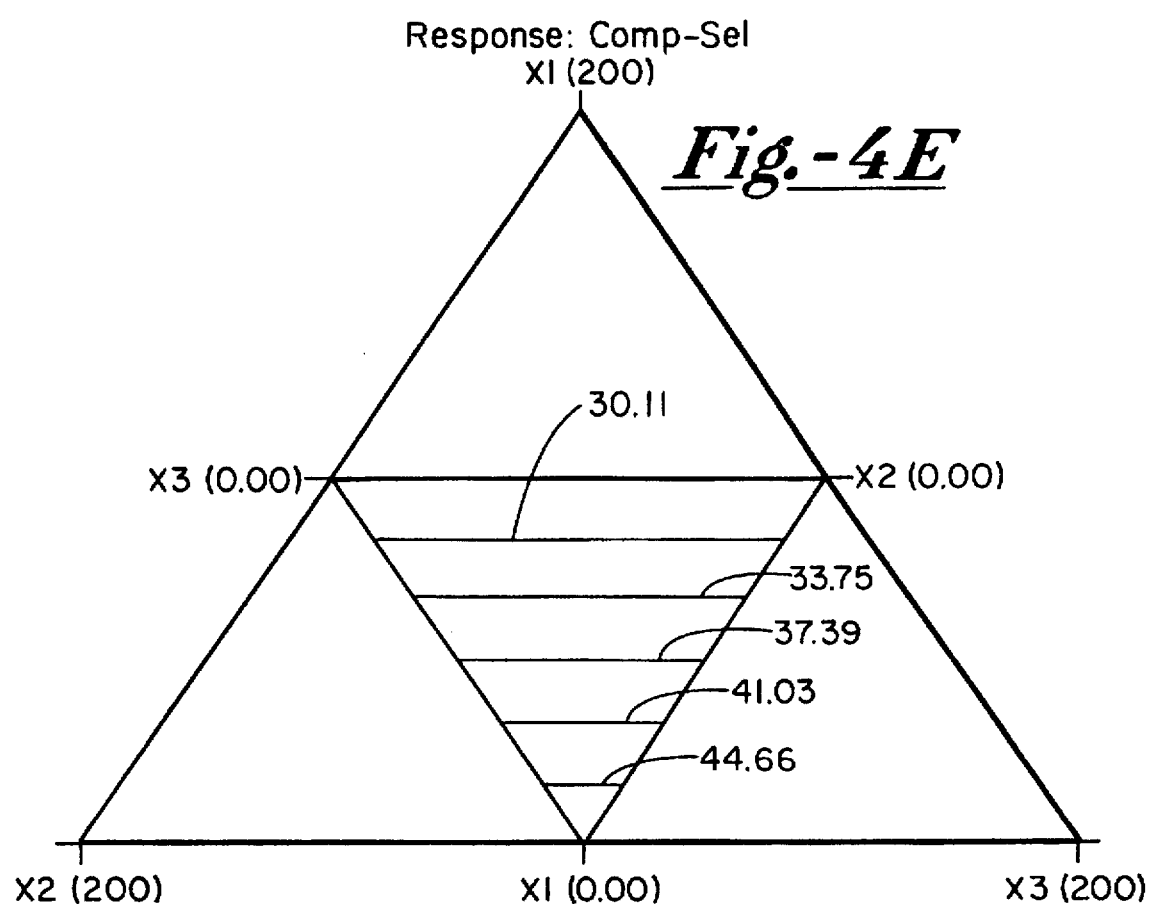

THERMALLY CONDUCTIVE INTERFACE FOR ELECTRONIC DEVICES

CROSS-REFERENCE TO RELATED APPLICATION

This is a continuation-in-part of application Ser. No. 08/445,048, filed May 19, 1995, now abandoned and entitled, "THERMALLY CONDUCTIVE INTERFACE FOR ELECTRONIC DEVICES".

BACKGROUND OF THE INVENTION

The present invention relates generally to a mechanically conformable thermally conductive interface for use in electrically isolating and thermally connecting printed circuit boards to either heat sinks, metal chassis, or heat spreaders. The interface material of the present invention has highly desirable electrical and mechanical properties, and may be utilized in virtually any assembly of an electronic device which requires heat to be transferred from the device to a frame, chassis, heat spreader, or other support surface.

In the past, various mechanically conformable interface devices have been proposed for isolating an electric device from a heat sink, such as a frame, chassis, heat spreader or the like. While these interfaces have been reasonably useful and performed reasonably well, the formulations of the present invention provide advantages from the standpoint of combining conformability with extremely good mechanical properties, superior electrical properties, and exceptional thermal as well as chemical properties. These advantages are made available by virtue of the utilization of silicone polymers of controlled molecular weight, and also through the optional utilization of a surface coating of a layer of pressure sensitive adhesive. As such, the thermal interface devices of the present invention facilitate assembly through low pressure flow to conform to the configuration of the assembly without impairing, sacrificing or otherwise impeding mechanical, electrical, thermal and chemical properties.

The thermally conductive interface material of the present invention comprises a member which consists of a highly conformable silicone polymer filled with a thermally conductive electrically insulative particulate, such as alumina and boron nitride. The silicone is a conventional organosiloxane having the structural formula:

$$H_2C=C-\underset{\underset{R_1}{|}}{\overset{\overset{R_1}{|}}{Si}}-\left(-O-\underset{\underset{R_1}{|}}{\overset{\overset{R_1}{|}}{Si}}-\right)_x-O-\left(\underset{\underset{R_1}{|}}{\overset{\overset{R_1}{|}}{Si}}\right)-C=CH_2$$

wherein $R_1$ represents hydrogen, hydroxyl or methyl groups, and wherein "x" represents an integer ranging from between 1 and 1000. Typically, the material is prepared as a reaction product of a liquid organosiloxane of the above formulation together with a chain extender such as hydride terminated polydimethyl siloxane material of the following structural formula:

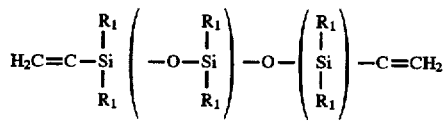

wherein "$R_2$" represents either hydrogen, methyl or hydroxyl groups, and wherein "y" represents an integer having a value of between 1 and 1000. Utilization of chain extenders of this type for controlling the molecular weight of polymers of organosiloxanes are, of course, well known. Also, the methods and techniques for reacting the materials are known in the art and consist generally of blending the materials and heating for a period of about 5 minutes at 120° C. in the presence of a platinum catalyst and a cure inhibitor such as a cyclic vinyl siloxane.

The other class of materials uses a copolymer such as follows:

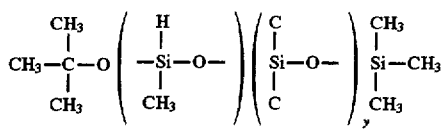

wherein the mole ratio of "x" to "y" may vary from 10% to 100%. Copolymers of hydromethylsiloxane and dimethylsiloxane are known. Materials in this class perform as cross-linking agents. Other types include tri-functional and tetrafunctional hydrosiloxanes, such as, for example:

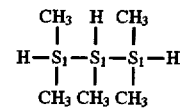

In order to provide a suitable carrier for the polymeric material which also has good mechanical, electrical, and thermal properties, layer of fiberglass may be used and is well suited for this application. Fiberglass having a density of between about 1 and 4 oz. per square yard may be employed, with the carrier preferably having a thickness of 3 mils.

In actual application, the finished thermally conductive interface material of the present invention preferably has a thickness ranging from between 20 mils and 500 mils, with this range of thickness providing the desired overall thermal resistance to permit substantially universal application, as well as providing appropriate comformability for the interface. Electrical properties are, of course, enhanced with thicknesses near the upper range, however, with the voltage breakdown of the material being sufficiently high so as to permit the utilization of thicknesses ranging up to and greater than about 125 mils. In certain applications, materials having a thickness of as low as about 15 mils may be employed, and for certain other applications where the operating conditions are such that the thermal resistance available is sufficiently low so as to permit thicknesses ranging up to about 500 mils.

Other carriers may be used, including aluminum foil varying in thickness from 1 mil to 10 mils. Polyimide (amide) films such as Kapton® may be used in thicknesses of 1 mil to 3 mils. Polyester film in the thickness range of 1 mil to 10 mils may also be found useful. The composition may also be injection molded into various shapes or forms, or alternatively, press-molded into sheets with or without reinforcements.

In certain applications, it is desirable to provide a coating of a pressure sensitive adhesive on one or both major surfaces. Pressure sensitive adhesives consisting essentially of polydimethylsiloxane may be suitably employed. In some of these applications, it may be desirable to utilize a release film to facilitate handling of the thermally conductive interface material prior to actual final utilization or assembly operations.

The features of the present invention will be more fully understood upon a review of the following specification, appended claims and accompanying drawing.

BRIEF DESCRIPTION OF THE DRAWING

FIGS. 4A–4E inclusive are graphs of compositions exhibiting isobars of viscosity (FIG. 4A), forces required to achieve a compression of 10% of the original thickness (FIG. 4B), forces required to achieve a compression of 50% of the original thickness (FIG. 4C), the response in solvent absorption (FIG. 4D), and compressive set (FIG. 4E);

DESCRIPTION OF THE PREFERRED EMBODIMENT

Figure 1:
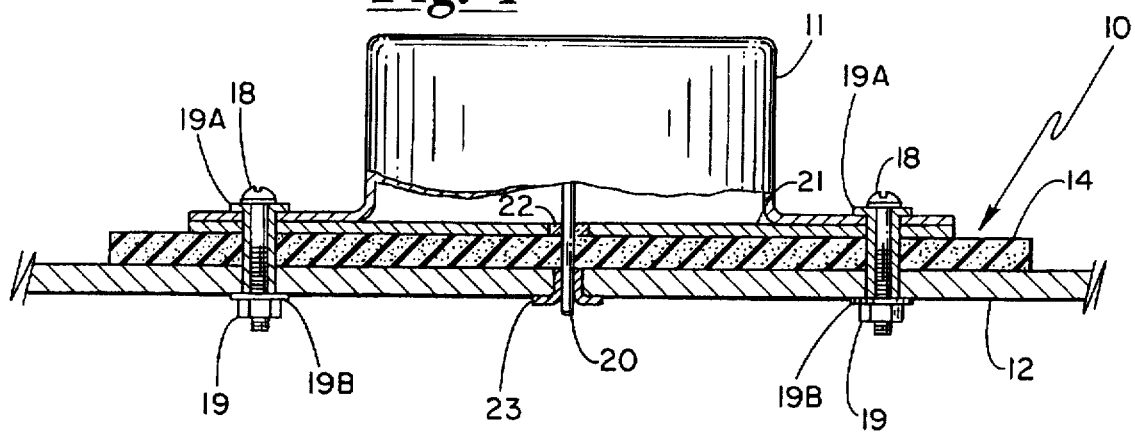
FIG. 1 is a sectional view taken through an assembly utilizing a thermally conductive compliant interface material prepared in accordance with the present invention.
Figure 2:
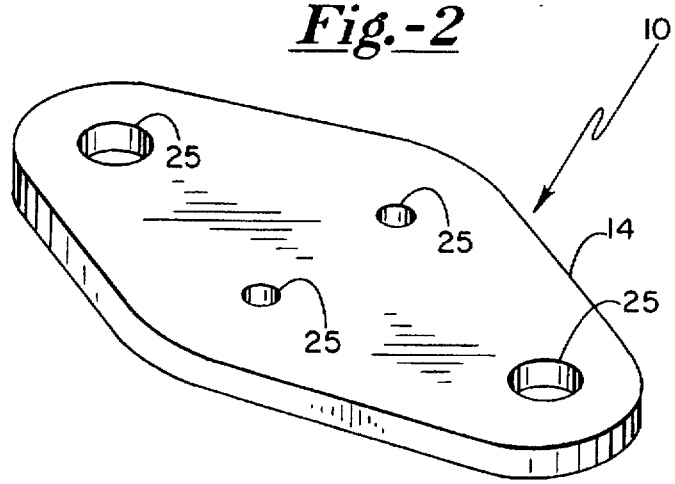
FIG. 2 is a perspective view showing the configuration of a custom formed interface device prepared in accordance with the present invention.

In accordance with the preferred embodiment of the present invention, a mechanically compliant thermally conductive interface material or pad is prepared utilizing a fiberglass carrier, and with the layer of the compliant material being disposed on either side of the carrier. The compliant material consists of a compressive or compressible silicone polymer loaded with a particulate filler selected from the group consisting of alumina and boron nitride and blends thereof. If desired, and for certain applications, a pressure sensitive adhesive may be employed on either of the two major surfaces, with the pressure sensitive adhesive facilitating assembly and production in certain applications and situations.

The mechanically compliant thermally conductive interface materials of the present invention may be prepared in accordance with the specific examples set forth below.

EXAMPLE 1

An organosiloxane having the structural formula:

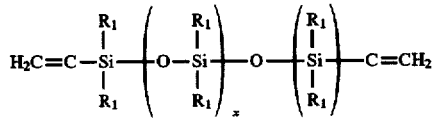

is selected, with $R_1$ representing methyl groups, and with the material being liquid and having a viscosity of 1000 centipoises. This material is blended is with a dihydrol aliphatic chain extender consisting essentially of a polydimethylsiloxane hydride terminated and with a viscosity of 500 centipoises. Such chain extenders are, of course, commercially available.

The reactants are blended, and approximately 25 ppm of catalyst consisting essentially of divinyl adduct of platinic acid was added, and the material was placed in a vessel wherein a centrally positioned fiberglass carrier was provided. The mixture was then cured at 150° C. for a period of 10 minutes. The fiberglass carrier had a density of 2 oz. per square yard and a thickness of 4 mils. A layer of pressure sensitive adhesive was applied to the upper surface, with the pressure sensitive adhesive consisting essentially of polydimethylsiloxane. This film of adhesive is compatible with the silicone and bonds to the surface with the composite material then being prepared for cutting or other fabrication which may be required for custom or general application. A release film comprising polyethylene is typically utilized as the undersurface layer, and will, of course, remain with the compliant thermal interface as long as required. The overall thickness of the composite material when completed was 80 mils.

EXAMPLE 2

The organosiloxane of Example 1 was employed with a chain extender consisting essentially of polydimethylsiloxane hydride terminated, and having a viscosity of 100 centipoises being utilized. The processing conditions were the same as those of Example 1 and a mechanical compliant thermally conductive interface material was formed therefrom. This material was filled with a particulate solid consisting essentially of alumina having an average particle size of about 5 microns, with the composite comprising 29% by weight of alumina, balance polymer. Such materials are, of course, commercially available. The overall thickness is 25 mils.

EXAMPLE 3

An organosiloxane having the structural formula:

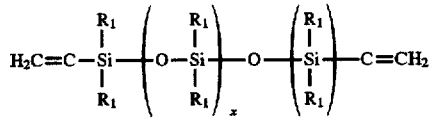

is selected, with $R_1$ representing methyl groups, and with the material being liquid and having a viscosity of 100 centipoises. This material is blended is with a dihydryl aliphatic chain extender consisting essentially of polydimethylsiloxane hydride terminated. Such chain extenders are, of course, commercially available.

The reactants were blended, and approximately 25 ppm of catalyst consisting essentially of platinum was added, and the material was placed in a vessel wherein a central fiberglass carrier was provided, and the mixture was then cured at 150° C. for a period of 10 minutes. The fiberglass carrier had a density of 2 oz. per square yard and a thickness of 4 mils. A layer of pressure sensitive adhesive was applied to the upper surface, with the pressure sensitive adhesive consisting essentially of polydimethylsiloxane. This film of adhesive is compatible with the silicone and bonds to the surface with the composite material then being prepared for cutting or other fabrication which may be required for custom or general application. A release film comprising polyethylene is typically utilized as the undersurface layer, and will, of course, remain with the compliant thermal interface as required. The overall thickness of the composite material when completed was 125 mils.

EXAMPLE 4

An organosiloxane of greater molecular weight having the structural formula:

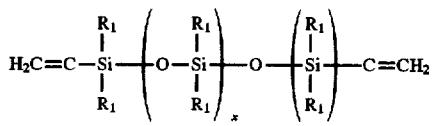

is selected, with $R_1$ representing methyl groups, and with the material being liquid and having a viscosity of 500 centipoises. This material is blended is with an dihydroxy aliphatic chain extender consisting essentially of polydimethylsiloxane hydride terminated. Such chain extenders are, of course, commercially available.

The reactants were blended, and approximately 25 ppm of catalyst consisting essentially of platinum was added, and the material was placed in a vessel wherein a central fiberglass carrier was provided, and the mixture was then cured at 150° C. for a period of 10 minutes. The fiberglass carrier had a density of 2 oz. per square yard and a thickness of 80 mils. A layer of pressure sensitive adhesive was applied to the upper surface, with the pressure sensitive adhesive consisting essentially of polydimethylsiloxane. This film of adhesive is compatible with the silicone and bonds to the surface with the composite material then being prepared for cutting or other fabrication which may be required for custom or general application. A release film comprising polypropylene is typically utilized as the undersurface layer, and will, of course, remain with the compliant thermal interface as required.

EXAMPLE 5

An organosiloxane of lower molecular weight having the structural formula:

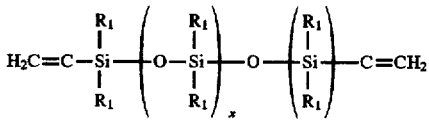

is selected, with $X_1$ representing methyl groups, and with the material being liquid and having a viscosity of 10 centipoises. This material is blended with a dihydroxy aliphatic chain extender consisting essentially of hydride terminated polydimethyl siloxane. Such chain extenders are, of course, commercially available.

The reactants were blended, and approximately 25 ppm of catalyst consisting essentially of platinum was added, and the material was placed in a vessel wherein a central fiberglass carrier was provided, and the mixture was then cured at 150° C. for a period of 10 minutes. The fiberglass carrier had a density of 2 oz. per square yard and a thickness of 40 mils. A layer of pressure sensitive adhesive was applied to the upper surface, with the pressure sensitive adhesive consisting essentially of polydimethylsiloxane. This film of adhesive is compatible with the silicone and bonds to the surface with the composite material then being prepared for cutting or other fabrication which may be required for custom or general application. A release film comprising polyethylene is typically utilized as the undersurface layer, and will, of course, remain with the compliant thermal interface as required.

TYPICAL PROPERTIES OF COMPLETED PRODUCT

Figure 3:
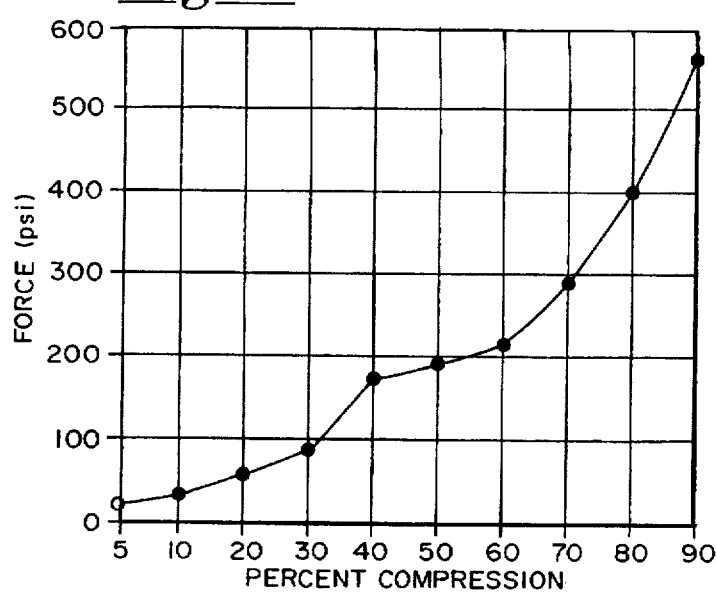
FIG. 3 is a graph showing a percent compression versus applied force for a complaint thermally conductive interface material prepared in accordance with the present invention.

As indicated above, the mechanical, electrical, thermal and chemical properties of the mechanically compliant thermally conductive interface material of the present invention have been found to be excellent. An example of the compression versus applied force is given in FIG. 3, with this curve illustrating the desirable and predictable compression exhibited by the various applied forces being applied. With respect to the remaining properties, the materials in Tables I, II and III are felt to be of interest. These tables are set forth below.

TABLE I

TYPICAL ELECTRICAL PROPERTIES
Voltage Breakdown:

| Thickness (inches) | Volts AC | Test Method |
| --- | --- | --- |
| .020 | 7000 | ASTM D-149 |
| .050 | 10000 | ASTM D 149 |
| .060 | 12000 | ASTM D 149 |
| .080 | over 20000 | ASTM D-149 |
| .125 | over 20000 | ASTM D-149 |

TABLE II

TYPICAL MECHANICAL PROPERTIES

| Thickness | .020" to .500" | ASTM D-374 |
| --- | --- | --- |
| Color | Pink | Visual |
| Compressive Modulus | 300 PSI | ASTM D 1621 |
| Compression Deflection | | |
| 10% | 30 PSI | ASTM D-575 |
| 50% | 200 PSI | ASTM D-575 |
| Compression Set | 65% | |

TABLE III

THERMAL PROPERTIES
(Typically using the Interface of Example I, Thickness 80 mil)

| Pressure (psi) | Thermal Resistance (°C./W) (to −220) | Thickness (mils) | Thermal Resistance (ASTM D-54P) (°C.-in²/W) |
| --- | --- | --- | --- |
| 25 | 6 | 20 | .46 |
| 50 | 5 | 30 | .70 |
| 100 | 4 | 40 | .93 |
| 200 | 3 | 50 | 1.16 |
| | | 60 | 1.39 |
| | | 80 | 1.85 |
| | | 125 | 2.90 |

It will be appreciated, of course, that other forms of the interfaces of the present invention may be utilized and fabricated, and other techniques may be utilized for their preparation as well.

EXAMPLE 6

To the interface fabricated in accordance with Example 1, a surface layer of a pressure sensitive adhesive consisting of polydimethylsiloxane was applied, with the pressure sensitive adhesive layer having a thickness of 1 mil. This material is compatible with the silicone and bonded well thereto. When pressure sensitive adhesive layers are employed, a second release film may be utilized, or alternatively material may be packaged in roll form.

Figure 4A:
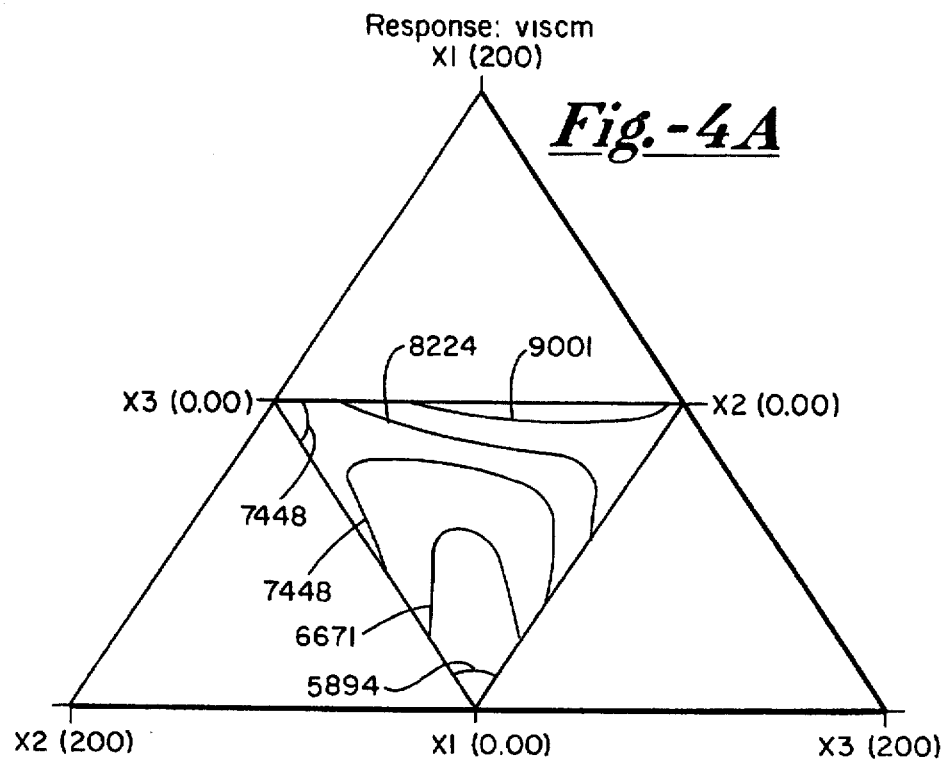
Figure 4B:
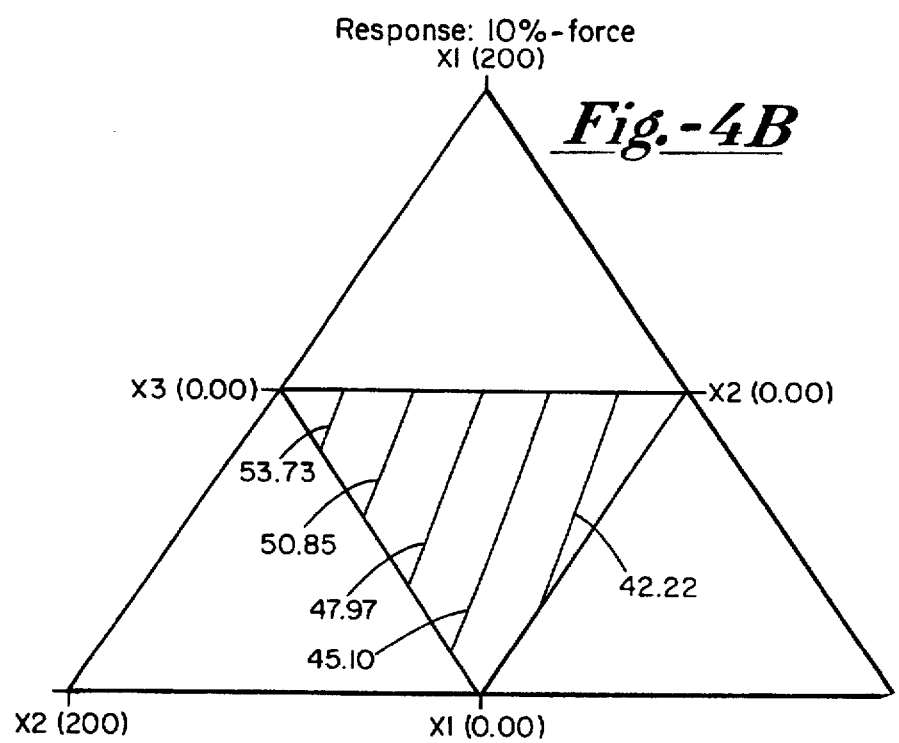
Figure 4C:
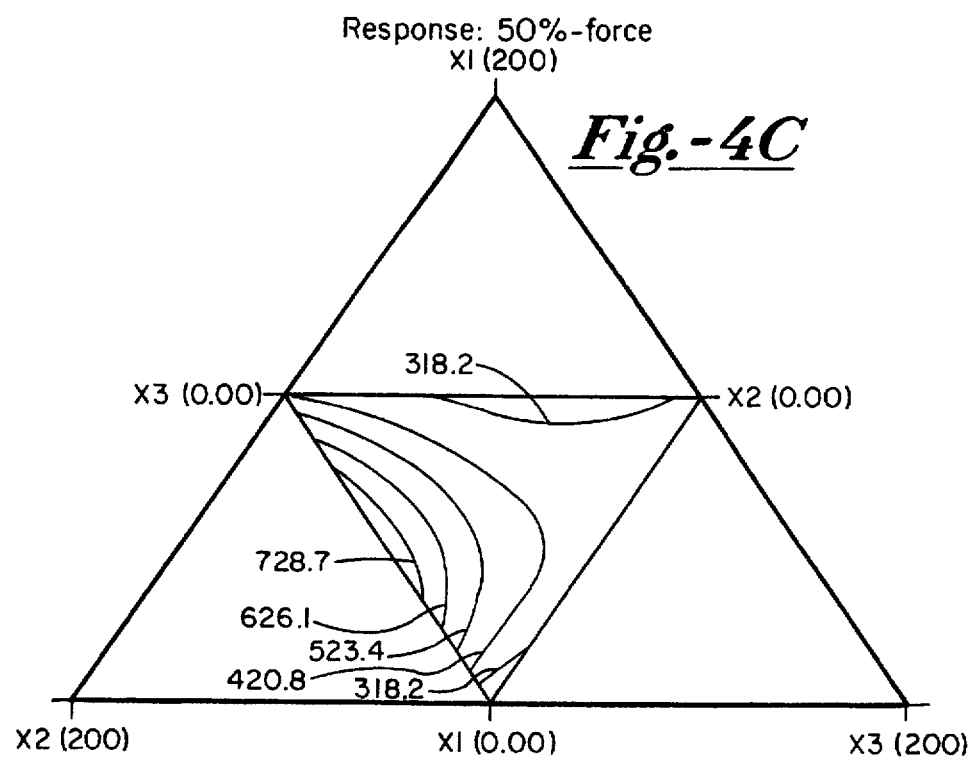
Figure 4D:
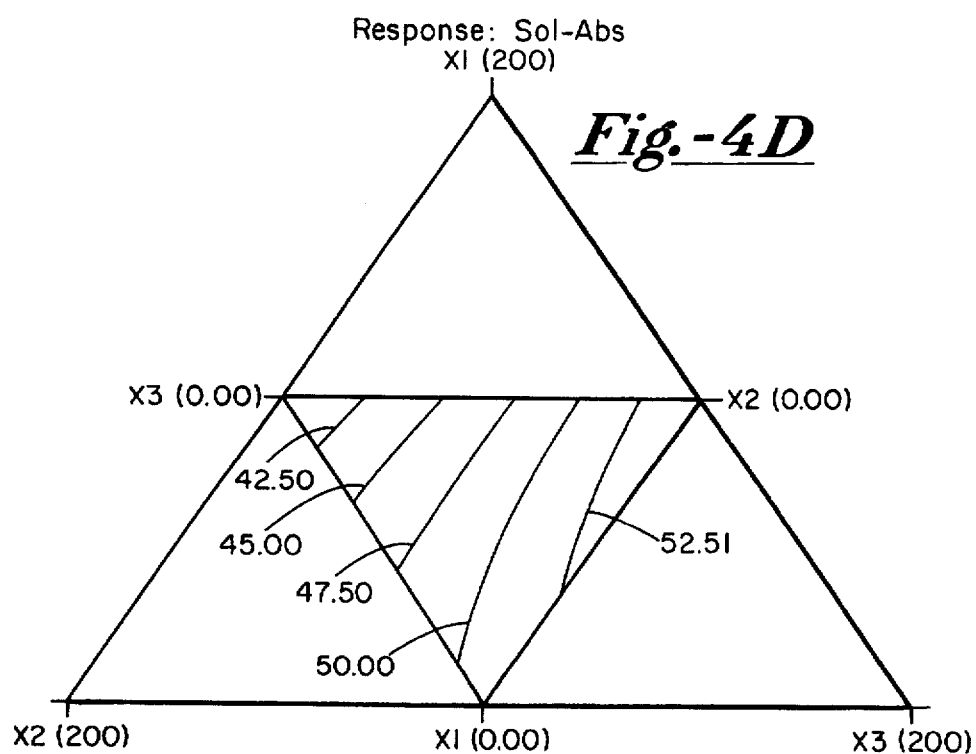

With attention now being directed to FIGS. 4A through 4E of the drawings, FIG. 7A represents isobars of viscosity achieved by changes in formulation. A review of FIG. 4A demonstrates the dramatic effect of addition of 100 centipoises. FIG. 4C indicates the significant effect of the low viscosity divinylsilicone on the hardness properties of the finished product.

EXAMPLE 7

A composite mixture design experiment was undertaken to determine the effects of various reactants on the properties of the reactant product. The reactant product was blended with alumina so that in each example, the alumina content was as follows:

Alumina (average particle size, 5 microns)=71% by weight

Polymeric component=29% by weight (a) 1000 cps divinylsilicone ($x_1$)=1 to 100 mole %

(b) 100 cps divinylsilicone ($x_2$)=0 to 100 mole %

(c) 500 cps dihydryl silicone ($x_3$)=0 to 100 mole %.

The reactants were blended and treated in accordance with the conditions set forth in Example 1 without the presence of fiberglass.

The design matrix was set up and the results were analyzed on a computer.

The properties measured and set forth in FIGS. 4A through 4E are as follows:

(a) Viscosity in centipoises (FIG. 4A);

(b) 10% compression force (the force required to achieve compression of 10% of the original thickness) (ASTM-D-575) (FIG. 4B);

(c) 50% compression force (the force required to achieve compression of 50% of the original thickness) (ASTM-D-575) (FIG. 4C);

(d) solvent absorption in percent (24 hours) (FIG. 4D); and (e) compression set (ASTM-D-395) (FIG. 4E).

EXAMPLE 8

The reactants of Example 2 were utilized to prepare a reactant product, with the reactant product being filled with particulate graphite, with the material comprising 50% by weight graphite, balance polymer. A material having excellent thermal properties was obtained with a desirable overall thickness being 25 mils.

GENERAL ASSEMBLY ARRANGEMENT

Figure 5:
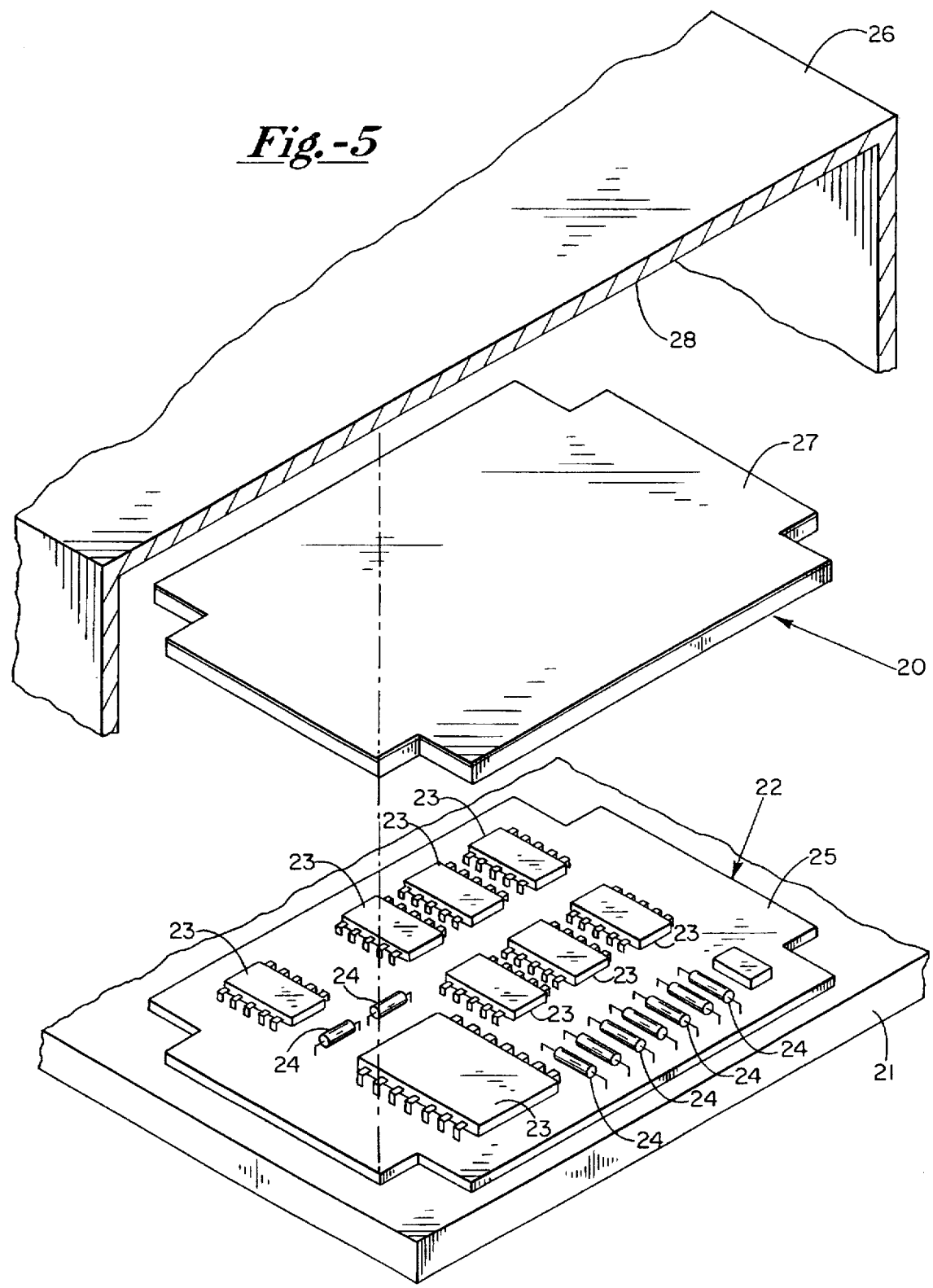
FIG. 5 is a perspective view, in exploded form, illustrating a typical assembly employing the interface material of the present invention as a component of the assembly.
Figure 6:
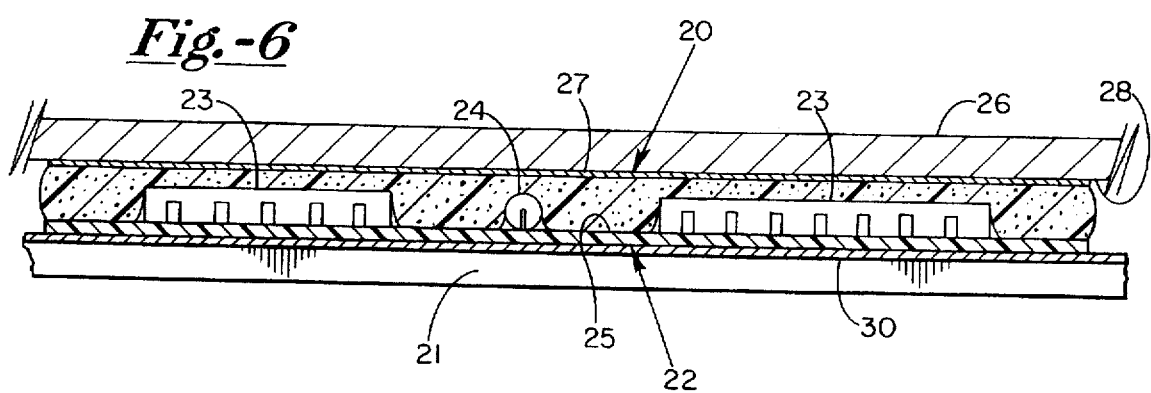
FIG. 6 is a vertical sectional view taken through the assembly illustrated in FIG. 5 and showing the manner in which the interface material complies with the components comprising the circuit assembly.

With attention now being directed to FIGS. 5 and 6 of the drawings, the overall electronic apparatus generally designated 20 comprises a base or chassis member 21 having a circuit array 22 in the form of electrical and electronic components arranged thereon. The circuit components typically include solid state active components such as transistors, microchips and the like as at 23—23. The array 22 may also include a number of passive components such as illustrated at 24—24 in the form of resistors, capacitors, and the like, all arranged in place on board 25. The entire assembly is housed within shroud member 26, with shroud 26 cooperating with chassis 21 to form the completed enclosure. Mechanically compliant, thermally conductive interface member generally designated 27 is interposed between the upper surfaces of both chassis 21 and circuit array 22 and the opposed inner surface 28 of shroud 26.

With attention now also being directed to FIG. 6, it will be seen that those portions of the compliant thermally conductive interface pad 27 in contact with circuit components deforms from its flat planar or rectangular configuration to flow and thereby envelop and accept the individual circuit components in the cavities formed therewithin. In FIG. 6, two of the microchips 23—23 of circuit board 25 are illustrated in their assembled form with the compliant thermally conductive interface flowing and adapting to the configuration required by the components in order to achieve the result illustrated. Because of the highly desirable flow characteristics of the formulations of the present invention, the compliant thermally conductive interface pad 27 deforms under extremely low pressure, without disturbing, disrupting, or otherwise interfering with the integrity of the leads and other delicate parts of the individual circuit components.

In order to enhance heat dissipation from the assembly, thermally conductive layers are illustrated at 29 and 30, with these layers enhancing the performance.

As can be ascertained from the figures, the mechanically compliant thermally conductive interface possesses physical properties such that the soft material comprising the interface flows to form natural cavities therewithin. The low durometer of the product enables the interface member to conform to the irregular surfaces of the circuit assembly. Because of the low durometer, pressures as low as approximately 10 psi are typically all that is necessary to achieve the result.

It will be appreciated, of course, that various modifications may be made to the specific examples given hereinabove without departing from the spirit and scope of the invention.

What is claimed is:

1. A mechanically compliant thermally conductive interface for interposing between a heat sink and electronic device for use as a mounting barrier in combination with the electronic device, comprising:

(a) a laminate comprising a substrate having outer layers disposed on opposite sides of the substrate, with the substrate being selected from the group consisting of layers of fiberglass, aluminum foil, copper foil, expanded metals, polyimide(amide), and polyester;

(b) said layers comprising the reactant product of a blend of an organosiloxane having the structural formula: structural formula:

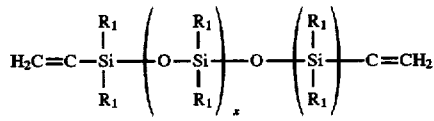

wherein $R_1$ is selected from the group consisting of hydrogen, hydroxyl or methyl groups, and wherein "x" represents an integer having a value of between 1 and 1000 and a viscosity of between about 10 and 10,000 centipoises, with a chain extender having the structural formula:

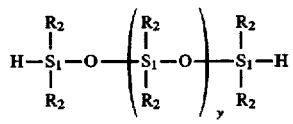

wherein "$R_2$" is selected from the group consisting of hydrogen, methyl and hydroxy groups, and wherein "y" represents an integer having a value of 1 and 1000 and a viscosity of between about 10 and 10,000 centipoises, and wherein the organosiloxane reactant product is filled with an amount of between about 10% and 60% by volume particulate solids, balance reactant product.

2. The mechanically compliant thermally conductive interface as set forth in claim 1 being particularly characterized in that said particulate solids are selected from the group consisting of alumina, boron nitride, graphite, titanium boride, alumina trihydrate, alumina nitride, and blends thereof.

3. The mechanically compliant thermally conductive interface as defined in claim 2 being particularly characterized in that said particulate solid is alumina having a size range of between about 1 and 50 microns.

4. The mechanically compliant thermally conductive interface as defined in claim 1 being particularly characterized in that said compliant thermally conductive interface has a thickness of between 0.010 inch and 1.00 inch.

5. The mechanically compliant thermally conductive interface as defined in claim 4 wherein thickness is between 20 and 1,000 mils.

6. The mechanically compliant thermally conductive interface as defined in claim 1 being particularly characterized in that said organosiloxane consists essentially of polydimethylsiloxane.

7. The mechanically compliant thermally conductive interface as defined in claim 6 wherein said chain extender consisting of a polydimethylsiloxane hydride terminated.

8. The mechanically compliant thermally conductive interface as defined in claim 7 wherein said chain extender is hydroxy terminated polydimethyl siloxane.

9. The mechanically compliant thermally conductive interface as defined in claim 7 being in admixture comprising 71% by weight alumina, balance polydimethyl siloxane and wherein the range of force required to achieve compression of 10% of the original thickness is in the range of from 10 to 200 psi.

10. The mechanically compliant thermally conductive interface as defined in claim 7 being in admixture comprising 71% by weight alumina, balance polydimethyl siloxane and wherein the range of force required to achieve compression of 50% of the original thickness is in the range of from 40 to 1000 psi.

11. The mechanically compliant thermally conductive interface as defined in claim 6 wherein the thermal conductivity is in the range of between 0.5 Watt/meters per degree K. and 4 Watt/meters per degree K.

12. The mechanically compliant thermally conductive interface as defined in claim 6 wherein the filler is graphite.

13. The mechanically compliant thermally conductive interface as defined in claim 1 wherein the viscosity ranges from between 10 and 1000 centipoises.

* * * * *